United States Patent Office 3,414,049
Patented Dec. 3, 1968

3,414,049
REGENERATOR SYSTEM FOR MHD GENERATORS
Hellmuth Mentschel and Jürgen-Dietrich Welly, Erlangen, Germany, assignors to Siemens Aktiengesellschaft, a corporation of Germany
Filed Mar. 3, 1967, Ser. No. 620,347
Claims priority, application Germany, Mar. 5, 1966, S 102,376
6 Claims. (Cl. 165—4)

ABSTRACT OF THE DISCLOSURE

A high-temperature heat exchanger system, particularly for MHD generators, is composed of a ring arrangement of regenerators filled with heat storage masses of substantially spherical constitution. The regenerators are two interconnected groups of which one is traversed by hot combustion waste gases while the second group is traversed by fresh air to be preheated. Cyclical control means switch periodically a regenerator from the hot (inlet) end of the gas group to the hot (outlet) end of the air group and simultaneously a regenerator from the cold (inlet) end of the air group to the cold (outlet) end of the gas group.

Specification

Our invention relates to a high-temperature system of heat exchangers for continuous heating of flowing media. In a more particular aspect the invention concerns heat exchangers for preheating the combustion air supplied to magnetohydrodynamic (MHD) generators, utilizing the heat contained in the waste gases from fuel combustion. The economic performance of MHD generators operating with combustion waste gases makes it desirable to preheat the fuel, for example oil or coal gas, to temperatures above 1200° C.

It is an object of the invention to devise a heat-exchange principle and system which provides separate flow paths for the waste gases and the fresh air respectively, with the aid of modular components operating on the principle of regenerators (heat exchange within the same flow space), while better preventing slag depositions to occur in the heat exchangers and securing a more continuous heating of a medium supplied, than has heretofore been feasible.

Another object of the invention, subsidiary to the one mentioned and relating to heat-exchanger systems for the operation of MHD generators, is to afford the recovery of seed material from the spent combustion gas and permit adding seed material to the fresh air within the heat exchangers, up to a desired degree of enrichment.

To achieve these objects, and in accordance with our invention, we provide a number of heat-exchanging regenerator units or modules and connect them in two groups which incrementally change relative to each other and of which each provides a continuous flow channel. One of these groups forms part of the flow path for the waste gases that supply heat, while the other group simultaneously forms a flow path for fresh air to be preheated. We further provide this two-group system with control means which, from time to time, switch each group in a given direction forward by at least one regenerator. Each group thus operates cyclically as a ring system whose starting end is switched incrementally through the entire ring, the cycle being repeated many times over a sufficient length of time.

While reference is made in the foregoing as well as hereinafter to combustion waste gases as the heat supplying medium and to air as the heated medium, it should be understood that the system of the invention is applicable to any other heat supplying and heat consuming media and, hence, that the terms "waste gas" and "fresh air," herein used for convenience, are meant to also refer to such other media.

The flow direction of the waste gases and of the fresh air, as well as the direction in which the regenerators are switched stepwise along the ring system are such that the operation of the heat exchanger system, viewed as a whole, is comparable to a counterflow principle. The fresh air flows through serially connected regenerator units, passing each time into a hotter regenerator.

According to another, more specific feature of the invention, the regenerators used in the heat exchange system are preferably heat storage furnaces with a stationary filling heat-exchanging solid material in the form of gravel, lumps or other pieces, for example of generally spherical shape. This avoids transportation problems otherwise encountered, and also affords providing large heat-exchanging surfaces. The entire storage mass then participates in the heat-exchanging operation, this is in favorable contrast to heat exchangers which—as suggested elsewhere—operate with fine-granular storage masses. In exchangers of the latter type, as much as about 30% of the heat-storing mass are located in pressure locks, separators for seed material and transporting devices, thus being not active at any time in the heat-exchanging operation proper.

A recovery of seed material from the waste gases and the addition of seed material to the fresh gas in a heat-exchanger system according to the invention is afforded simply by providing the regenerator bottom beneath the storage mass with a drain leading to a bunker which can be switched into the respective flows of waste gas and fresh air. Since the same pressure obtains in the seed material bunker as in the regenerator, the valves interposed between these devices need not meet any exacting requirements.

The temperature of the waste gases and of the fresh air leaving each heat exchanger can be largely kept constant at a desired value. A further temperature regulaion is obtainable by periodically connecting or disconnecting standby regenerators between the two groups connected in the waste-gas flow and the fresh-air flow. This permits adding, when needed, a further hot regenerator to the fresh-air group and switching a further cold regenerator into the waste-gas group. When applying the heat-exchanger system for MHD generators, it is desirable to maintain the temperature of the fresh air as constant as feasible. This can be achieved by providing the valves in the fresh-air flow with a controllable cross section and by correspondingly controlling the valves of the two last regenerators in the fresh-air group.

The invention will be further described with reference to embodiments of heat-exchanger systems according to the invention schematically illustrated on the acompanying drawings by way of example.

Figure 1:
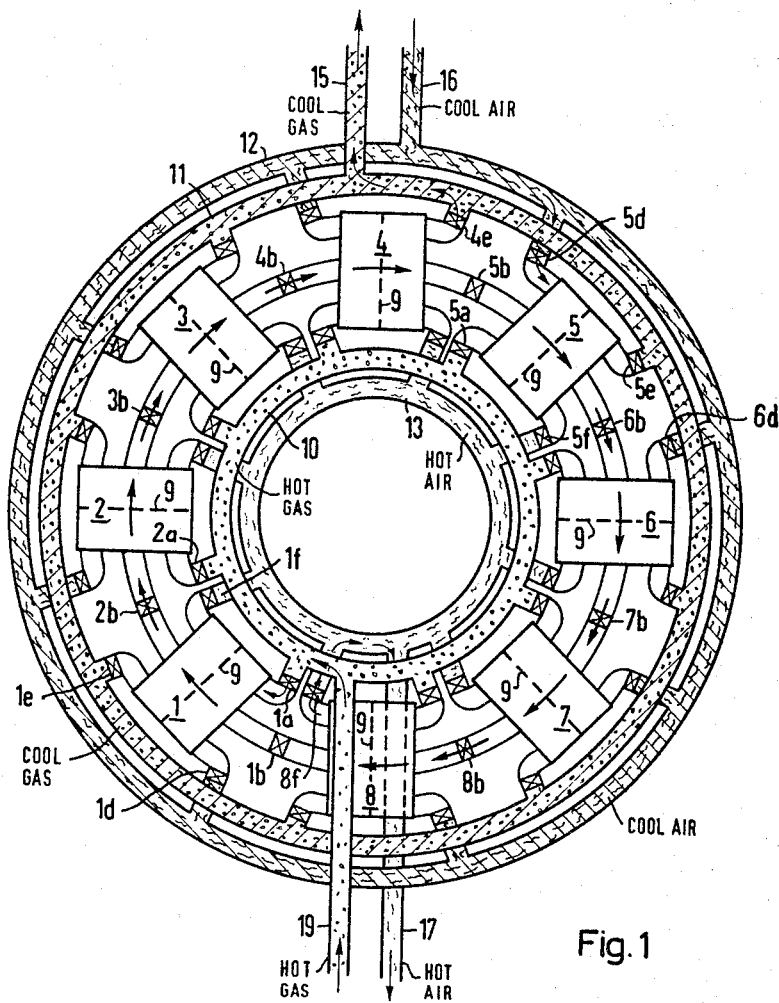
FIG. 1 shows a ring arrangement of light regenerators forming conjointly a heat-exchanger system in accordance with the invention.

According to FIG. 1, eight regenerators 1 to 8 are arranged in a ring system. For explanation, assume that each regenerator contains heat storing mass arranged in a plane which extends along the broken line 9 and perpendicularly to the plane of illustration. On one side of the heat-exchanging storage mass, the regenerator 1 is connected to three lines with respective control valves, the valves and corresponding lines being denoted by 1a, 1b, and 1d. Three lines with respective valves, analogously denoted by 1e, 2d and 1f, are connected to the opposite side of the same regenerator 1. Corresponding triplets of lines with respective valves are connected to each of the other seven regenerators, these lines and valves being designated by analogous letters added to the reference numeral for the regenerator.

While the ring system is shown to have geometrically a circular shape, it will be understood that this is not necessary.

The heat-exchanger system receives hot waste gases through a gas inlet line 19 connected with a manifold ring line 10, this being indicated by arrows. The ring line 10 is connected by the above-mentioned lines 1a to 8a to the respective regenerators 1 to 8. The connecting lines 1e to 8e communicate through another manifold ring line 11 with an outline line 15 for the cooled waste gases. Fresh air to be heated is supplied through an air inlet line 16 and a further manifold ring 12 to pass into the regenerators through connecting lines 1d to 8d. The connecting lines 1f to 8f, located on the same side of the storage mass with which the lines 1a to 8a communicate, pass heated air through a fourth manifold ring 13 to an air outlet line 17.

It will be recognized that the regenerators 1 to 8 in the illustrated system are connected between each two ring manifolds 12 and 13 for fresh air and two ring manifolds 10, 11 for waste gas. By controlling the valves in respective lines 1b to 8b, the regenerators can be connected in series. For a given operating moment represented in FIG. 1, those valves that are open are designated by an arrow which also indicates the direction of flow passing through the valve. The other valves, not marked by an arrow in FIG. 1, are closed at the moment under observation. Further arrows indicate the flow direction of the waste gases and of the fresh air.

As shown by the arrows, the regenerators 1 to 4 are connected in series through the connecting lines 2b and 4b and thus constitute a group in the flow path of the waste gas. Simultaneously the regenerators 5 to 8 are series connected through the lines 6b and 8b and constitute a second group in the path of the fresh air. The valves 1b and 5b are blocked.

At given time points, namely when the storage mass of the generator (1) located in the first (hottest) place of the waste-gas group has reached its maximal temperature, each of the two groups is switched forward by at least one regenerator in the direction of the waste-gas flow. For thus switching the system, the valve 1a is to be closed and simultaneously the valve 2a is to be opened. For rinsing the regenerator 1, it is advisable to first open the valve 1b a small amount only. This provides for throttled pressure rinsing of the regenerator, and prevents the pressure in regenerator 1 from increasing too rapidly. The valve 2b is closed with some time delay after the opening of valve 1b, namely so that the waste-gas filling of the regenerator 1 can just reach the regenerator 2. After completed rinsing, when the pressure of the fresh gas air flow obtains in regenerator 1, the valve 1b is fully opened simultaneously with the valve 1f, and the valve 8f is closed. Now the regenerator 1 is switched from the last (hottest) place of the gas group into the last (hottest) place of the fresh-air group.

The switching of the first (coldest) regenerator in the fresh-air flow to the regenerator group traversed by the waste gas is effected simultaneously with the forward switching of the regenerator 1. This is done as follows. The valve 6d is opened and the valves 5b and 6b are closed simultaneously. For expansion rinsing of regenerator 5, the valve 5b is first opened slightly until pressure equalization with the waste gases in the ring line is obtained. Thereafter the valves 5b and 5e are to be opened completely, and the valve 4e is to be closed completely. Due to the above-described switching the localities between the two regenerator groups advance in the circulating sense of the waste-gas flow.

With the heat-exchanger system according to FIG. 1, four switching stages cause eight regenerators to be switched forward within a full cycle of operation. The hot temperature zone, having a high temperature at which slag and seed material evaporate, then travels through the regenerators of the system in the direction of the same cycle. This results in self-cleaning of the heat-exchanger system according to the invention.

Designating the number of regenerators by $n$, it will be recognized that $n/2$ switching operations cause $n$ regenerators to be switched forward. It is an essential characteristic of such an operation that the temperature variations in the waste-gas and waste-air current behind the heat-exchanger system are reduced $n/2$ times so that, by suitable choice of the number of regenerators, the temperature characteristic of a recuperator can be approached.

The optimal time which should be permitted to elapse between each two switching operations, this time being designated as switching period $T_u$, can be determined from the following equation:

$$T_u = \frac{L_s}{v}$$

wherein $L_s$ denotes the length of travel of the gas flow through the storage mass per regenerator, and $v$ is the speed of the heat front. The speed $v$ is given by $$v = \frac{\epsilon}{1-\epsilon} \cdot \frac{\rho_g \cdot c_p}{\rho_s \cdot c_s} \cdot v_g$$

wherein $\epsilon$ denotes the ratio of the gap volume in the storage mass to the total volume of the storage mass per regenerator and is called the "specific gap volume." Furthermore, $1-\epsilon$ = filling factor
$\rho_g$ = gas density
$\rho_s$ = density of the storage material
$c_p$ = specific heat of the waste gas
$c_s$ = specific heat of the storage material
$v_g$ = gas-flow speed For waste gases resulting from oil burners, the amount of $c_p$, for example, is $$c_p = 0.3 \left(\frac{\text{cal.}}{\text{g degree}}\right)$$

and $c_s$, for magnesium oxide MgO, may assume the value:

$$c_s = 0.32 \left(\frac{\text{cal.}}{\text{g degree}}\right)$$

The mass throughput $$\epsilon \cdot \rho_g \cdot v_g$$

then amounts, for example, to $$0.10 \left(\frac{\text{g}}{\text{cm.}^2 \text{ sec.}}\right) \text{ for fresh air}$$

and $$0.11 \left(\frac{\text{g}}{\text{cm.}^2 \text{ sec.}}\right) \text{ for waste gas}$$

Under these conditions the heat front travels 20 cm. in 7.5 minutes. Therefore, a length $L_s$ of 20 cm. requires forward switching every 7.5 minutes.

Figure 2:
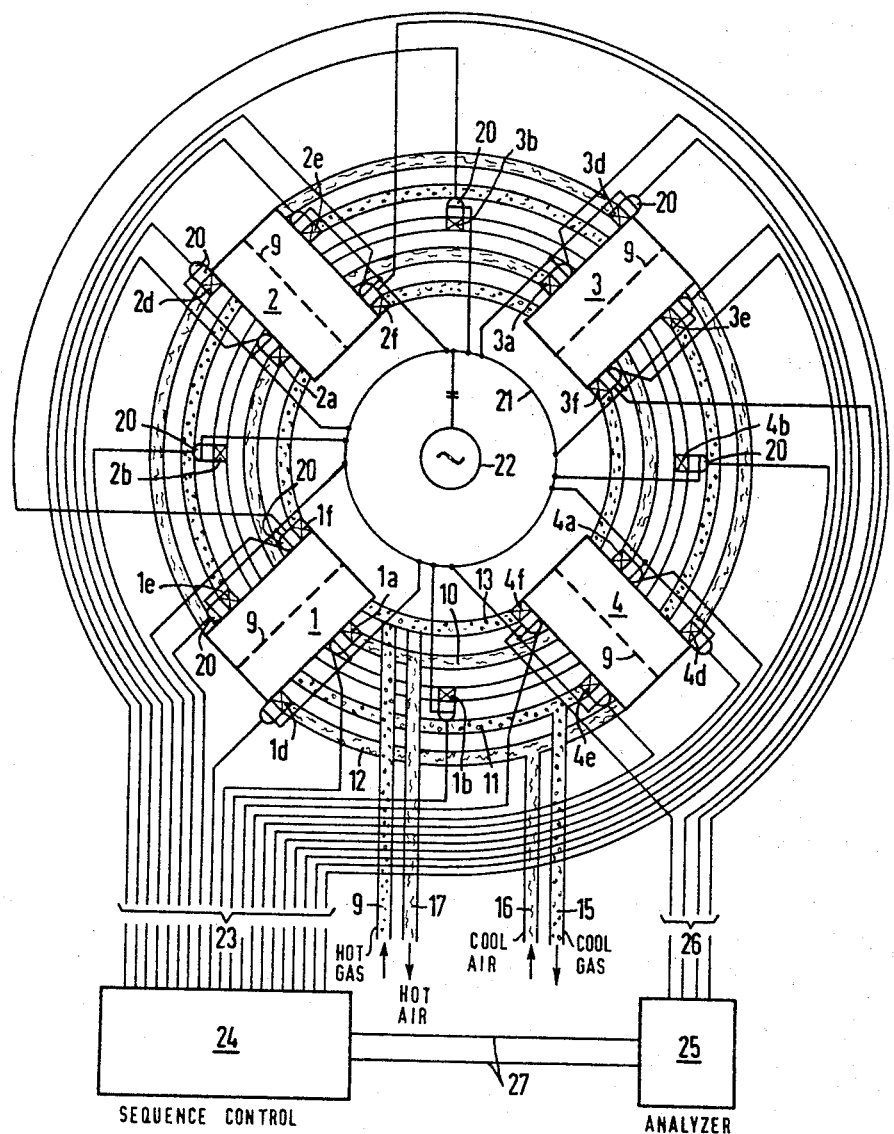
FIG. 2 is an electrical circuit diagram relating to the valve control of a heat-exchanger system similar to the one shown in FIG. 1, but limited to four regenerators.

FIG. 2 represents an embodiment of electric control circuits for a heat exchanger according to FIG. 1, except that it is shown provided with only four regenerators 1 to 4. In this embodiment, the ring manifolds 10 to 14 for waste gas and fresh air are arranged beneath the regenerators. The regenerators are connected with the manifolds by connecting lines equipped with valves 1a, to 4a, 1d to 4d, 1e to 4e and 1f and 4f, as explained with reference to FIG. 1. The valves are actuated by respective control motors 20. Electric power is supplied by an electric manifold or ring cable 21 energized from a utility network or generator 22. Each of the control motors is connected by a control cable 23 to a control desk 24 which contains the timing monitor for sequencing control of the valves.

The timer in the control desk 24 operates as a programmer for the forward switching of the regenerators 1 to 4. The time elapsing between each two switching operations, this being the switching frequency $$f_u = \frac{1}{T_u}$$

is controllable by means of an analyzer 25 responding to measured temperature values. The analyzer 25 is connected by signal leads 26 with temperature sensors in the outlet valves 1f, 2f, 3f and 4f for the heated fresh air. The analyzer 25 is essentially a comparator which compares a datum value with the temperature sensed by the sensor of the last open valve in the fresh-air flow. If the sensed temperautre drops below the datum value, the analyzing comparator 25 issues a command through a line 27 to the control desk 24 which causes the sequence controller to perform the next switching operation. In this manner, the temperature of the heated fresh air is kept constant or within narrow limist. Over long periods of time, however, the heat quantity dissipated from the fresh air must be equal to the heat quantity supplied by the waste gases.

Figure 3:
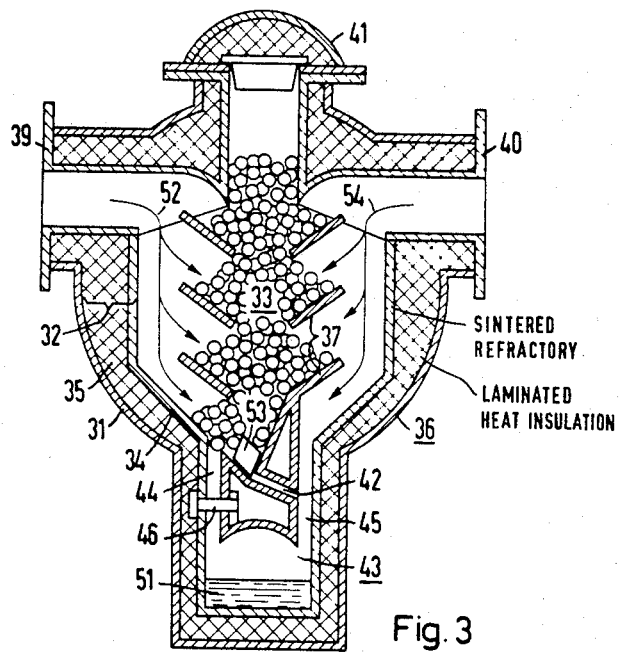
FIG. 3 is a sectional view of a regenerator for use as a heat exchanger in a system as exemplified by FIGS. 1 and 2.

The preferred embodiment of a regenerator exemplified in FIG. 3 comprises a jacket 31 of sheet steel and a heat insulating lining or masonry 32. It is advisable to form this masonry lining of magnesium oxide materials having respectively different densities, namely in such a manner that the chamber walls close to the storage mass 33 are formed by densely sintered material 34. Toward the outside, however, layers of material having a lower density, such as porous bricks, woven or felted material of magnesia ceramic may be arranged, and the spacing or thickness of these laminations or layers may also increase from the inside toward the outside. Such a stratified layer of heat insulation is designated by 35 in FIG. 3. The described design affords a high refractory resistance of the densely sintered magnesium-oxide ceramic in conjunction with the good heat retaining propreties of the porous material located at the outer side of the ceramic.

The regenerator may be designed and operative as a heat storing furnace with a stationary filling composed of gravel-lump- or piece-type material, preferably of substantially spherical shape. It is of advantage to design the regenerator essentially as a tube 36 in which a chamber for the storage mass 33 is left open in the refractory masonry within a plane along the axis. Guide structures 37 pass the flow of waste gas or air through the smaller thickness of the storage mass in the direction perpendicular to the tube axis 38. The regenerator is shown provided with connecting flanges 39 and 40 for attachment of the connecting lines leading to other regenerators. The storage mass 33 can be filled into the regenerator through a top opening provided with a removable cover 41.

The regenerator shown in FIG. 3 is devised for recovery of seed material. A drain 42 for seed material extends from beneath the storage mass 33 to a bunker 43 which can be inserted into the fresh-air flow path through conduits 44 and 45. The control of the seed-material throughput is obtainable if a flow block is inserted at least on the waste-gas or fresh-air side. This block may simply consist of a refractory brick because no particular seal is required.

The masonry 32 or other heat insulation of the regeneratros performs essentially only the purpose of thermally insulating the storage mass 33 from the environment. The thickness of the masonry may be the same for all of the regenerators of the heat-exchanger system and need be designed only for a median gas temperature between the minimal temperature of the fresh air and the maximal temperature of the waste gas. This is because the thermal inertia of heat conductance in the masonry has a favorable effect by virtue of the relatively high switching frequency of the heat-exchanger system according to the invention. In operation of the system, the temperature fluctuations in the individual regenerator occur with a wave characteristic synchronous to the switching frequency. Consequently, the thickness of the heat insulating masonry 32 need only be chosen to prevent the marginal layers close to the steel jacket 31 from suffering appreciable temperature variations. The temperature oscillations in the masonry are then attenuated, virtually down to zero.

The following numerical example is illustrative of the explanations just given. Assume that the heat-exchanger system receives fresh air at a temperature of 200° C. from a compressor which is not cooled, and that the heat exchanger receives hot waste gas of 1700° C. from an MHD generator. In this case the arithmetic median value of temperature is 950° C. The insulating masonry may then be composed as follows. The inner portion is formed of a double brick wall having a total thickness of 25 cm., the bricks consisting of densely sintered magnesia. The next layer is 19 cm. thick and composed of an inner portion formed of light-weight refractory brick constituted of porous magnesia ceramic and hence having a higher heat insulating effect than the sintered brick material. The next outer layer is 11 cm. thick and consists of magnesia ceramic of best available heat-insulating property. The resulting masonry has a total thickness of 78 cm. If the densely sintered ceramic is backed exclusively by uniform masonry of light-weight brick, a total wall thickness of 1 m. is sufficient. Aside from having excellent strength at high refractory temperatures, the densely sintered material has the further advantage of being sufficiently stable chemically with respect to the seed materials usually employed.

Seen in the flow direction, a thin layer of storage material covering a wide area is active in a heat exchange according to the invention. The heat-exchanging surface can be further increased by employing spherical storage masses composed of individual balls having a suitable diameter. This promotes increasing the switching frequency and further improves the temperature constancy of the heated fresh air leaving the heat-exchanger system. Due to the slight pressure of the heat-exchanging change in the regenerators, the pressure loss in the heat exchanger remains low. This is particularly important for the construction of MHD generators whose waste-gas pressure is only slightly above atmospheric pressure. In contrast to heat exchangers equipped with masonry to act as storage mass, the use of heat-exchanging spherical bodies increases the effective heat-exchanging surface for a given over-all volume. Another essential effect in a heat exchanger according to the invention is the strong turbulence of the flow within the mass of spherical storage bodies within the regenerators in conjunction with a quiescent flow behind the storage mass. For this purpose the length of the guide structures 37, in consideration of the flow sped and the operating conditions as well as the distance from the adjacent guide bodies, is to be so chosen that the turbulence is reduced and will approach a laminar flow. This increases the heat exchange between the flowing medium and the storage mass as compared with the heat exchange between medium and regenerator walls.

The diameter of the spherical storage bodies is upwardly limited by the fact that too large a diameter results in a small heat-exchange surface relative to unit volume. The minimum diameter is given by the fact that an excessive pressure drop and whirling of the storage mass must be limited. For these reasons, a diameter of approximately 1 cm. has been found preferable in practice, relating to bodies of sintered magnesia, for example.

The seed material throughput in a heat-exchanger system according to the invention will be explained with reference to FIG. 3. When the regenerator of FIG. 3 is switched into the waste-gas flow, it is traversed by gas in the direction of the arrow 52. Seed material will then become separated in the storage mass within the generators of the group located in the waste-gas flow. This seed material passes through the drain 42 into the bunker 43 where it is stored in molten, liquid form. As long as the flow blocks 46 of the regenerators in the waste-gas group are closed, the seed materials stored in the bunkers can hardly evaporate back into the waste-gas flow. It is an essential advantage that this stage of operation is attained without pressure blocks. A ball-type lock 53 may be disposed in front of the drain 42 in order to keep the drain 42 open. The regenerators in the fresh-air group are traversed by air in the direction of the arrow 54.

When a regenerator is switched from the waste-gas group into the fresh-air group, the flow block 46 is opened and a portion of the fresh air can then pass over the molten seed material 51. Each time a regenerator within the fresh-air group approaches the inlet locality for fresh air to such an extent that the temperature of the fresh air entering into the bunker 43 is below the boiling point of the seed material employed, the block 46 can be closed in order to prevent excessive cooling of the molten seed material 51.

If desired, seed material from the regenerators in the waste-gas group can be drained through a valve into a common collecting tank to be further used or recycled after having solidified.

The flow blocks 46 of the regenerators in the fresh-air group may also be controlled in such a manner that the fresh air becomes enriched with seed material up to a given, desired percentage.

To those skilled in the art it will be apparent from a study of this disclosure that our invention permits of a great variety of modifications and hence may be given embodiments other than particularly illustrated and described herein, without departing from the essential features of the invention and within the scope of the claims annexed hereto.

We claim:

1. A high-temperature heat-exchanger system for flowing media, comprising first inlet and outlet means for heat supplying medium, second inlet and outlet means for heat receiving medium, a number of regenerators, switchable connecting means interconnecting said regenerators and forming therewith two groups of which a first one forms a continuous flow path for heat supplying medium between said first inlet and outlet means, said second group forming a continuous flow path between said second inlet and outlet means, and cyclical sequence control means connected to said connecting means for controlling the latter to intermittently switch at least one regenerator operatively adjacent to the inlet means for each group from said group into the other group at a place operatively adjacent to the outlet means for the latter group.

2. In a heat-exchanger system according to claim 1, said regenerators being mounted in a ring arrangement and containing each a mass of heat storage material; said first inlet and outlet means comprising two respective manifolds for heat supplying waste gas, said second inlet and outlet means comprising two respective manifolds for air to be heated; said connecting means comprising lines having respective controllable valves and serially interconnecting said regenerators through said storage masses, two lines with respective valves connecting each of said regenerators at one side of said storage mass with said two waste-gas manifolds respectively, and two lines with respective valves connecting each of said regenerators at the other side of said storage mass with said two air manifolds respectively; said sequence control means being in controlling connection with all of said valves.

3. In a heat-exchanger system according to claim 2, said heat storage mass in said regenerators being formed of round gravel-type pieces of solid material.

4. In a heat-exchanger system according to claim 3, said heat storage mass in said regenerators being formed of substantially spherical bodies having a diameter in the order of one centimeter.

5. In a heat-exchanger system according to claim 3, said regenerators having an internal chamber for said heat storage mass and having refractory masonry of magnesia material around said diameter, said masonry consisting of high-density sinter material adjacent to said chamber and forming thereupon a stratified outer layer whose density decreases in the outward direction.

6. In a heat-exchanger system according to claim 5, said outer layer being formed of porous magnesia ceramic.

References Cited

UNITED STATES PATENTS

| | | | |
|---|---|---|---|
| 1,941,446 | 12/1933 | Isley | 263—19 |
| 3,185,457 | 5/1965 | Boll et al. | 263—19 |

ROBERT A. O'LEARY, *Primary Examiner.*

A. W. DAVIS, *Assistant Examiner.*